(12) United States Patent
Nishimura (10) Patent No.: US 7,967,485 B2
(45) Date of Patent: Jun. 28, 2011

(54) APPARATUS FOR AUTOMATICALLY ADJUSTING DIRECTION OF LIGHT AXIS OF VEHICLE HEADLIGHT

(75) Inventor: Kenichi Nishimura, Gifu (JP)

(73) Assignee: DENSO CORPORATION, Kariya (JP)

( * ) Notice: Subject to any disclaimer, the term of this patent is extended or adjusted under 35 U.S.C. 154(b) by 1406 days.

(21) Appl. No.: 10/959,165

(22) Filed: Oct. 7, 2004

(65) Prior Publication Data

US 2005/0083702 A1    Apr. 21, 2005

(30) Foreign Application Priority Data

Oct. 10, 2003   (JP) .................................. 2003-352605
Jul. 16, 2004   (JP) .................................. 2004-209922

(51) Int. Cl.
*B60Q 1/00*         (2006.01)
*F21V 1/00*         (2006.01)
(52) U.S. Cl. ..................... 362/466; 362/507; 362/531
(58) Field of Classification Search .................... 362/44, 362/465–466, 523–532
See application file for complete search history.

(56) References Cited

U.S. PATENT DOCUMENTS

| 4,968,896 | A | 11/1990 | Shibata et al. |
| 6,357,898 | B1 | 3/2002 | Toda et al. |
| 2002/0163814 | A1* | 11/2002 | Hayami et al. ................ 362/466 |
| 2002/0163815 | A1 | 11/2002 | Hayami |
| 2003/0043588 | A1 | 3/2003 | Horii |
| 2004/0085201 | A1 | 5/2004 | Dubrovin et al. |

FOREIGN PATENT DOCUMENTS

JP        6-42409        6/1994

OTHER PUBLICATIONS

Office Communication from European Patent Office issued on Feb. 9, 2006 for the corresponding European patent application No. 04024178.8-2423 (a copy thereof).

* cited by examiner

*Primary Examiner* — Jason Moon Han
(74) *Attorney, Agent, or Firm* — Posz Law Group, PLC (57) ABSTRACT

The apparatus for automatically adjusting horizontally a direction of a light axis of a vehicle headlight of the invention includes a steering angle sensor detecting a steering angle of a steering wheel of a vehicle, a swivel control unit performing a swivel control by which the direction of the light axis of the headlight is adjusted horizontally depending on the steering angle of the steering wheel, and an abnormality detecting unit detecting an abnormality associated with the apparatus. Even after detection of abnormality associated with the apparatus by the abnormality detecting unit, the swivel control unit continues performing the swivel control until the light axis is returned to a predetermined initial direction in order to avoid abrupt change of the direction of the light axis of the headlight. The swivel control unit halts the swivel control after the light axis is returned to the predetermined initial direction.

10 Claims, 6 Drawing Sheets

continued text.

APPARATUS FOR AUTOMATICALLY ADJUSTING DIRECTION OF LIGHT AXIS OF VEHICLE HEADLIGHT

CROSS-REFERENCE TO RELATED APPLICATION

This application is related to Japanese Patent Applications No. 2003-352605 filed on Oct. 10, 2003, and No. 2004-209922 filed on Jul. 16, 2004, the contents of which are hereby incorporated by reference.

BACKGROUND OF THE INVENTION

1. Field of the Invention

The present invention relates to an apparatus for automatically adjusting a light axis or a lighting area of a light beam emitted from a vehicle headlight on the basis of a steering angle of a steering wheel.

2. Description of Related Art

An apparatus for automatically adjusting directions of light axes of vehicle headlights is constituted by actuators for swiveling horizontally or vertically the vehicle headlights, an ECU (Electronic Control Unit) calculating swiveling or leveling angles of the vehicle headlights based on the signals received from the sensors mounted on the vehicle for detecting the attitude or state of the vehicle such as a steering angle sensor, vehicle height sensors, and a vehicle speed sensor. Such an apparatus has to be provided with fail-safe protection mechanism against failure or abnormality in theses sensors or a communication network, for example, a CAN (Controller Area Network) within the vehicle in order to enable returning the light axes of the vehicle headlights to the initial direction or straight forward direction, or lighting an alarm lamp when the failure or abnormality occurs.

Japanese Utility Model Application Laid-Open No. 6-42409 discloses a technique for directing forcibly the light axes of the vehicle headlights straight forward in response to the driver's manipulation of a specific manual switch when the steering angle sensor develops trouble.

Figure 7:
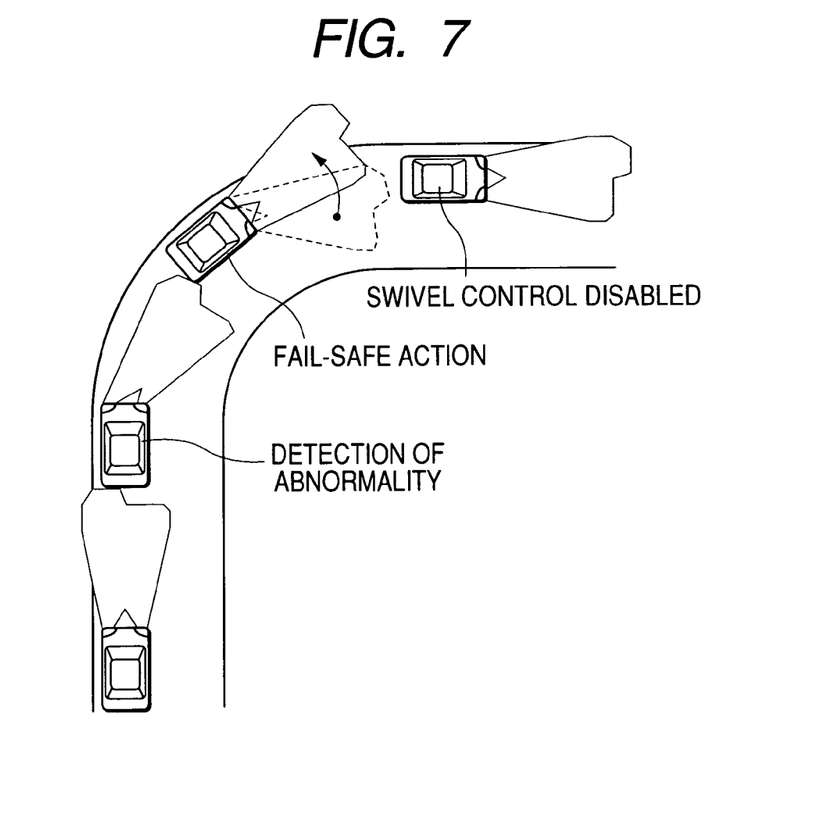
FIG. 7 is an illustration for explaining a fail-safe action in the prior art swivel control apparatus when an abnormality has occurred while a vehicle is turning.

According to this technique, if the steering angle sensor develops trouble while the vehicle is turning right, for example, the light axes of the vehicle headlights are returned to the straight forward direction promptly. This fail-safe action is represented by a curved arrow AR in FIG. 7 illustrating a vehicle making a right turn.

This fail-safe action causes an abrupt shift of the lighting area of the vehicle headlights from the swivel-controlled position represented by the dotted line to the straight forward position represented by the solid line. Since the direction of this shift is opposite to the turning direction of the vehicle, the driver feels odd and the visibility in the forward direction becomes worse. In addition, if the steering angle sensor is restored, the position of the lighting area of the vehicle headlights may shift abruptly again, because the swivel control on the light axes of the vehicle headlights resumes promptly after the restoration of the steering angle sensor. The drive feels odd also then.

SUMMARY OF THE INVENTION

The apparatus for automatically adjusting horizontally a direction of a light axis of a headlight of a vehicle of the present invention has a structure including:

a steering angle sensor detecting a steering angle of a steering wheel of the vehicle;

a swivel control unit performing a swivel control by which the direction of the light axis of the headlight is adjusted horizontally depending on the steering angle of the steering wheel; and an abnormality detecting unit detecting an abnormality associated with the apparatus;

wherein, after detection of abnormality associated with the apparatus by the abnormality detecting unit, the swivel control unit continues performing the swivel control until the light axis of the headlight is returned to a predetermined initial direction in order to avoid abrupt change of the direction of the light axis of the headlight, the swivel control unit halting the swivel control after the light axis of the headlight is returned to the predetermined initial direction.

The fail-safe action achieved by this structure makes it possible to avoid the driver of the vehicle from feeling odd to the movements of the light axes of the headlights and to avoid the lowering of visibility in the forward direction when system abnormality has occurred while the vehicle is turning.

If the swivel control unit still receives the steering angle signal normally from the steering angle sensor after the abnormality detecting unit detects the abnormality associated with the apparatus, the swivel control unit may continue to adjust the direction of the light axis on the basis of the steering angle signal until the light axis of the headlight is returned to the predetermined initial direction.

If the swivel control unit no more receives the steering angle signal normally from the steering angle sensor after the abnormality detecting unit detects the abnormality associated with the apparatus, the swivel control unit may adjust horizontally the direction of the light axis such that the light axis is returned gradually to the predetermined initial direction.

The swivel control unit may resume the swivel control when the abnormality detecting unit detects recovery from the abnormality after the steering angle detected by the steering angle sensor enters into a predetermined angular range within which the vehicle is assumed to be in a straight-running state.

The swivel control unit may return the light axis of the vehicle headlight from the swiveled-controlled direction to the predetermined direction at a rate of 5 to 30 (preferably 10 to 20) degrees/sec when the abnormality detecting unit detects the abnormality.

PREDERRED EMBODIMENTS OF THE INVENTION

Figure 1:
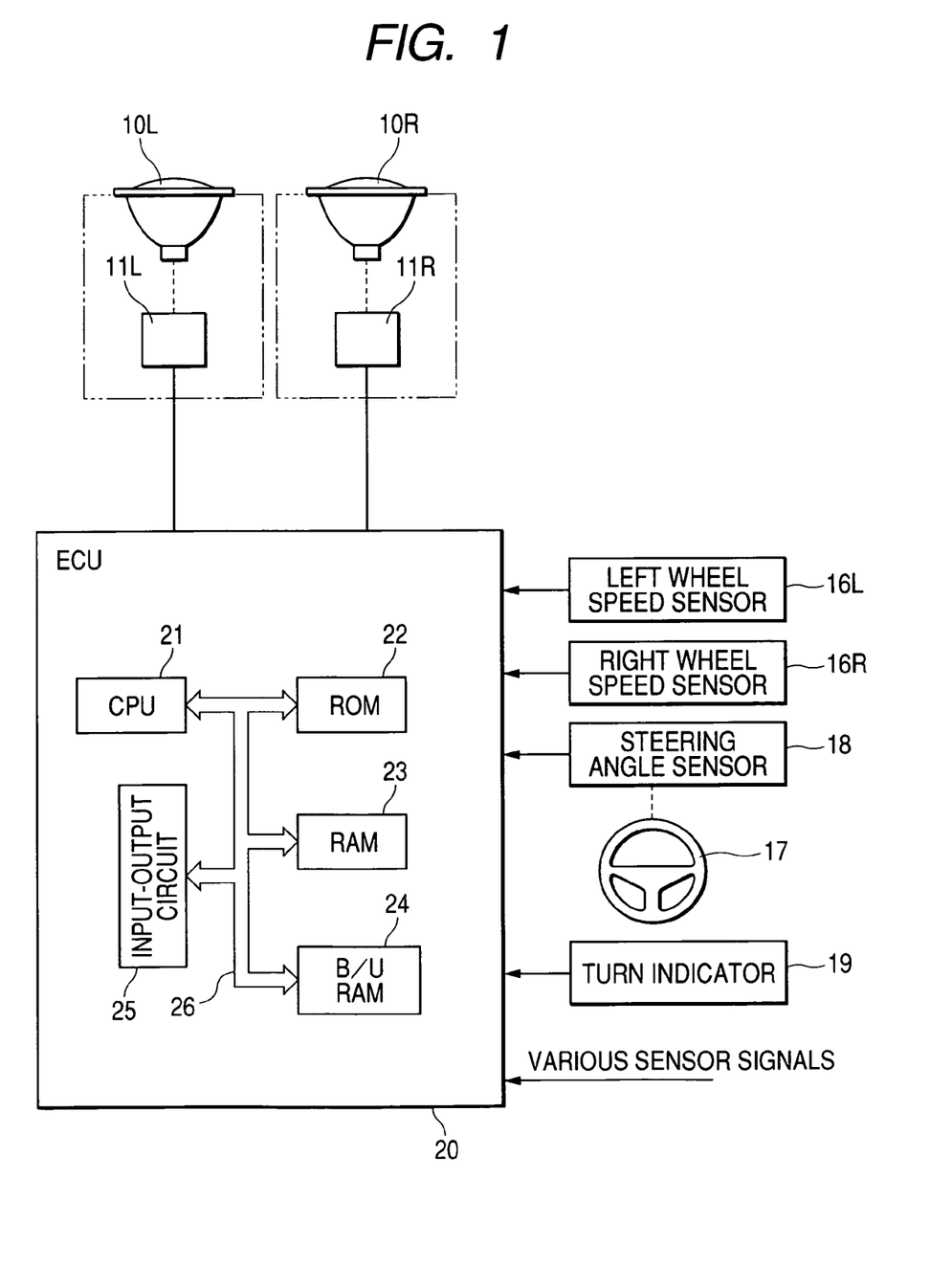
FIG. 1 is a schematic view showing an overall structure of an apparatus for automatically adjusting a direction of a light axis of a vehicle headlight according to an embodiment of the invention.

FIG. 1 shows an overall structure of an apparatus for automatically adjusting a direction of a light axis of a vehicle headlight according to an embodiment of the invention.

In this drawing, 10L and 10R denote left and right vehicle headlights, respectively. The headlights 10L and 10R are linked to actuators 11L and 11R for adjusting the light axes of the headlights 10L and 10R in the horizontal direction. An ECU (Electronic Control Unit) 20 includes a CPU 21 for executing various processings, a ROM 22 for storing control programs, control maps, etc., a RAM 23 for temporarily storing various data, a B/U (Back Up) RAM 24, an input-output circuit 25, and a bus line 26 for connecting these elements.

The ECU 20 receives an output signal from a left wheel speed sensor 16L detecting a left wheel speed VL, an output signal from a right wheel speed sensor 16R detecting a right wheel speed VR, an output signal from a steering angle sensor 18 detecting a steering angle θ of a steering wheel 17, and various sensor signals from other sensors, not illustrated. The actuators 11L and 11R act to adjust horizontally the directions of the light axes of the headlights 10L and 10R in accordance with signals outputted from the ECU 20.

Figure 2:
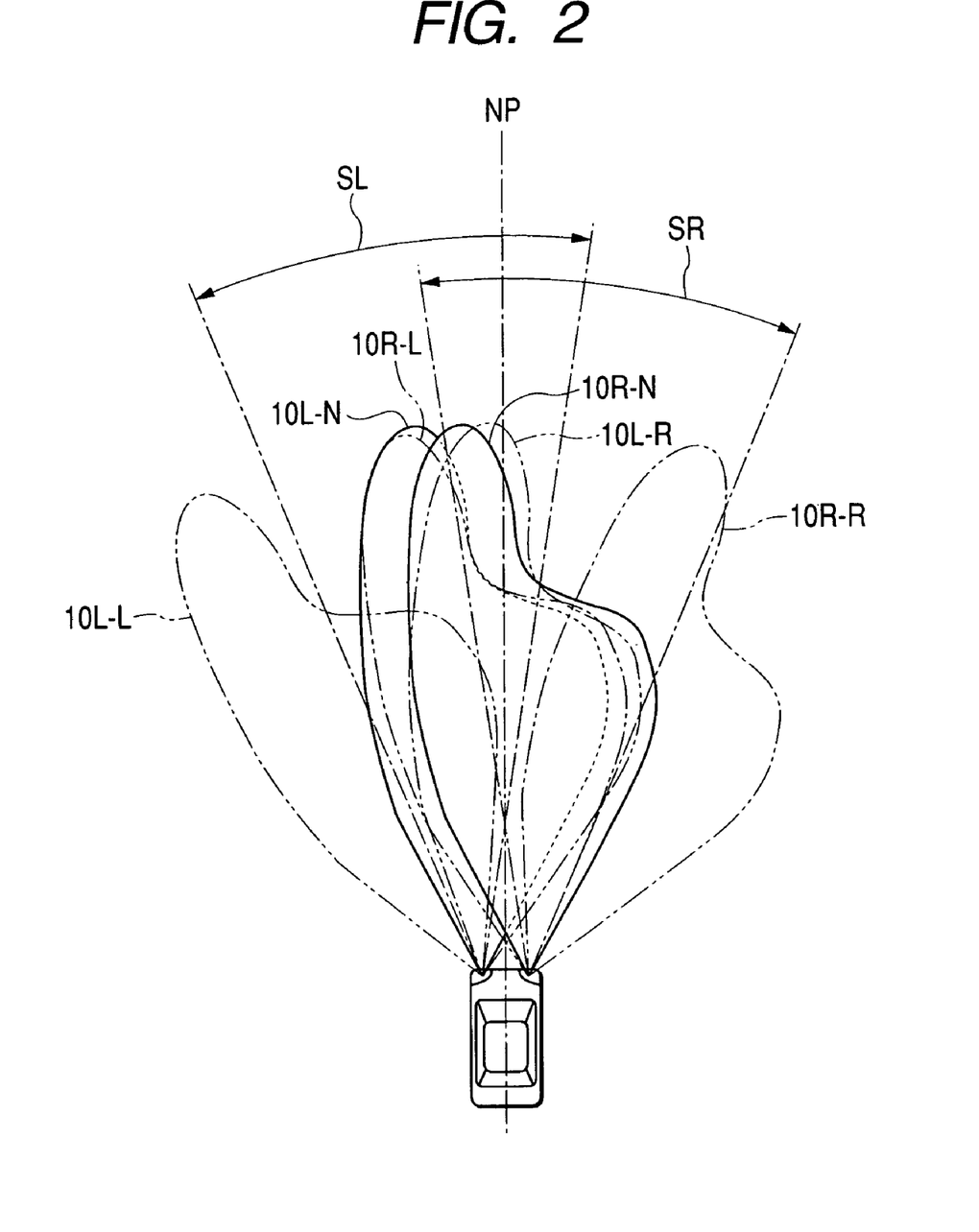
FIG. 2 is an explanatory view for explaining beam patterns of the headlights adjusted by the apparatus according to the embodiment.

FIG. 2 shows beam patterns of the headlight 10R and 10L (low beam). In this figure, the heavy solid line 10L-N represents a beam pattern of the headlight 10L when the steering wheel is in its neutral angular position. The arched arrow SL represents a swivel range within which the light axis of the headlight 10L can be swiveled in accordance with the steering angle of the steering wheel. The chain double-dashed lines 10L-R and 10L-L represent beam patterns of the headlight 10L when the light axis of the headlight 10L is in the rightmost position and the leftmost position within the swivel range, respectively. The heavy solid line 10R-N represents a beam pattern of the headlight 10R when the steering wheel is in the neutral angular position. The arched arrow SR represents a swivel range within which the light axis of the headlight 10R can be swiveled in accordance with the steering angle of the steering wheel. The chain double-dashed lines 10R-R and 10R-L represent beam patterns of the headlight 10R when the light axis of the headlight 10R is in the rightmost position and the leftmost position within the swivel range, respectively.

The swivel ranges SL and SR should provide the driver with good visibility in the leftward or rightward direction when the driver turns the steering wheel to the left or right without a sacrifice of visibility in the forward direction. Accordingly, as shown in FIG. 2, a portion of the swivel range SR at the right of the initial angular position is wider than that of the swivel range SL so that the variation of the light axis of the headlight 10R is larger than that of the headlight 10L when the driver turns the steering wheel to the right. On the other hand, a portion of the swivel range SL at the left of the initial angular position is wider than that of the swivel range SR so that the variation of the light axis of the headlight 10L is larger than that of the headlight 10R when the driver turns the steering wheel to the left.

Figure 3:
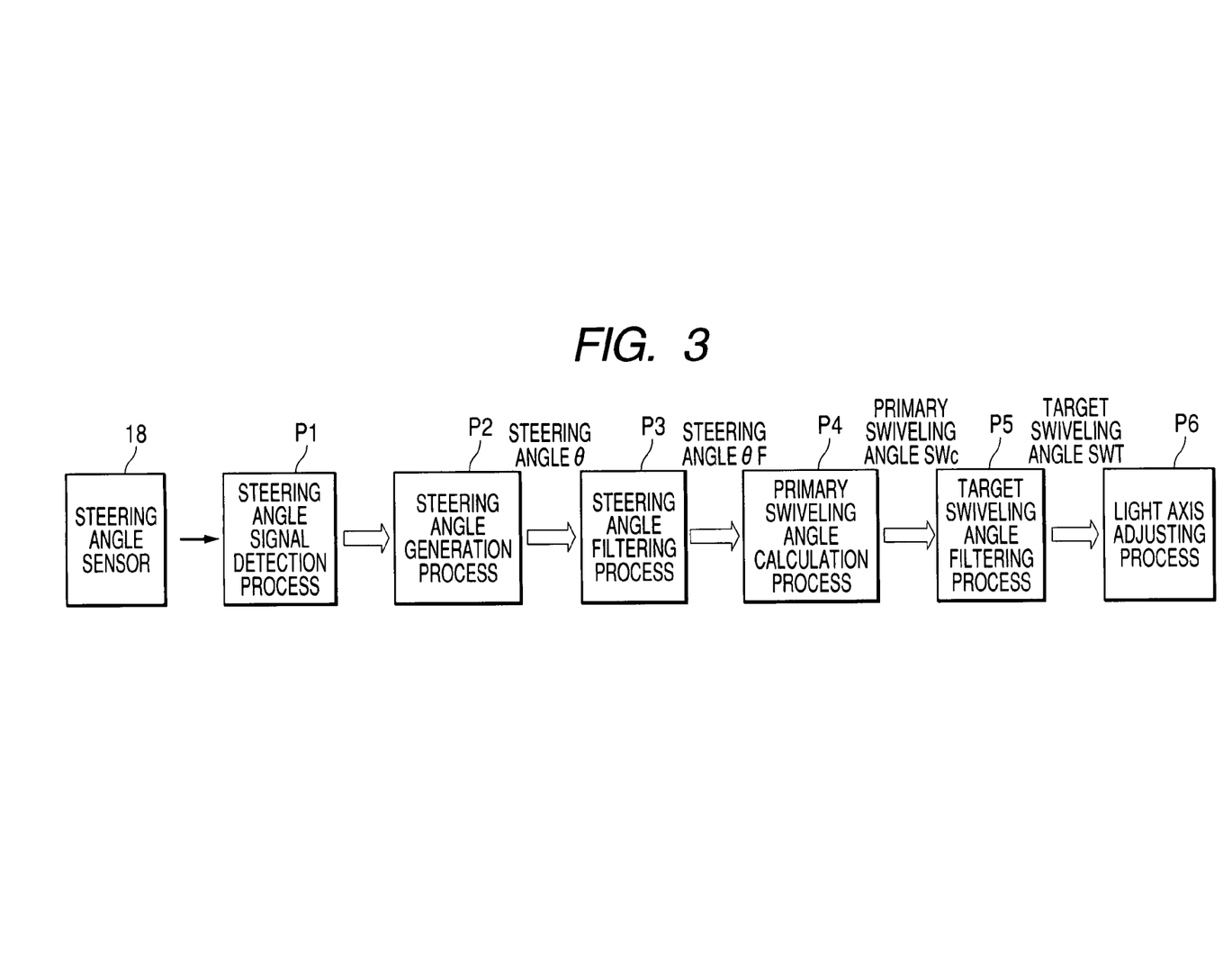
FIG. 3 is a diagram showing a signal flow in executing the swivel control when a steering angle sensor is functioning normally and the output signal of the steering angle sensor is still received normally in the apparatus according to the embodiment after abnormality has occurred.

FIG. 3 is a diagram showing a signal flow in executing the swivel control when the steering angle sensor 18 is functioning normally, and the output signal of the steering angle sensor 18 is still received normally after abnormality has occurred. The steering angle sensor 18 outputs a signal depending on a steering angle of the steering wheel 17. This output signal is subjected to a steering angle detection process P1 to produce a steering angle signal. This steering angle signal is subjected to a steering angle calculation process P2 to calculate a steering angle θ. This steering angle θ is subjected to a steering angle filtering process P3 in which a filter F (not sown) is used. The filtered steering angle θF is subjected to a primary swiveling angle calculation process P4 to calculate a primary swiveling angle SWc. This primary swiveling angle SWc is subjected to a target swiveling angle filtering process P5 in which a filter FSW (not shown) is used to generate a target swiveling angle SWT. This target swiveling angle SWT is supplied to a light axis control process P6 for causing the actuators 11L, 11R to adjust horizontally the directions of the light axes of the headlights 10L, 10R.

Figure 4:
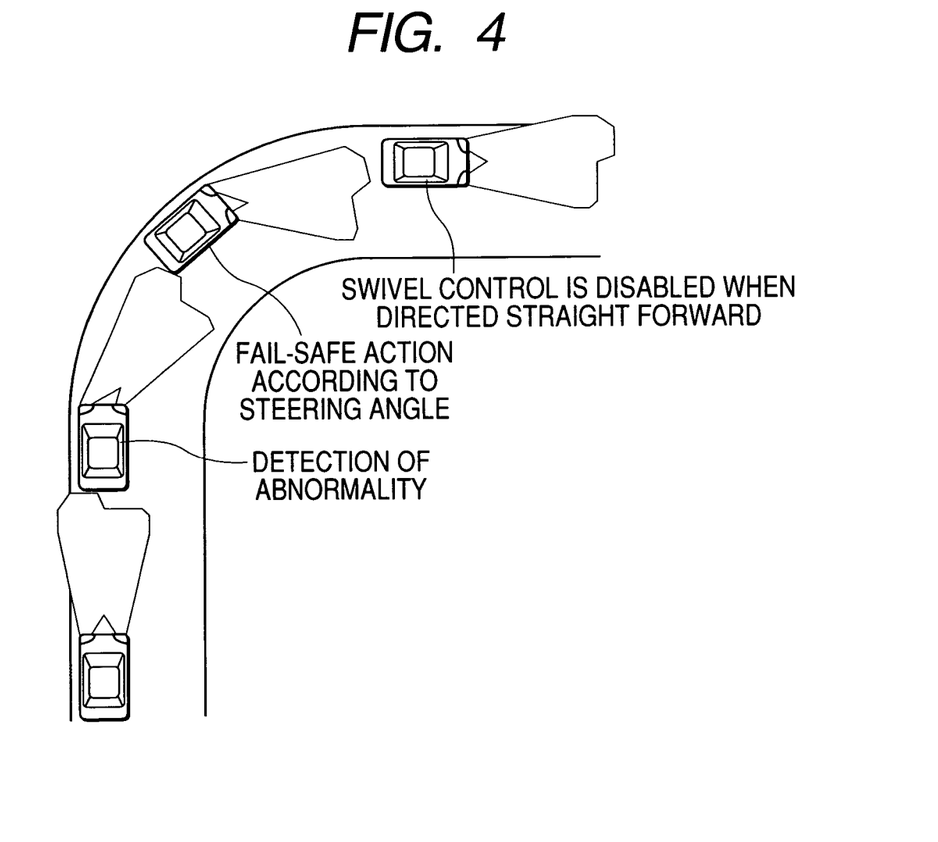
FIG. 4 is an illustration for explaining the fail-safe action of the apparatus according to the embodiment when an abnormality has occurred while a vehicle is turning.

FIG. 4 illustrates a vehicle making a right turn, the directions of the light axes of the headlights 10L, 10R of this vehicle being controlled by the CPU 21 within the ECU 20 performing the processings shown in the diagram of FIG. 3 on the output signal of the steering angle sensor 18. Assume that a system abnormality not originating from the steering angle sensor 18 has occurred while the steering wheel 17 of this vehicle is turned to the right. In the aftermath of the detection of this system abnormality by an abnormality detecting unit (not illustrated) constituted by the ECU 20, the directions of the light axes of the headlights 10L, 10R are still controlled horizontally on the basis of the output signal of the steering angle sensor 18, and accordingly, they are still well adjusted to the right-turning road.

In spite of this system abnormality, the swivel control on the directions of the light axes of the headlights 10L, 10R is continued as long as the output signal of steering angle sensor 18 is effective. When the vehicle finishes the right turn, and goes into a straight-running state where the light axes of the headlights 10L, 10R are returned to the straight forward direction or initial direction, the swivel control is disabled. As explained above, when the system abnormality has occurred while the vehicle is turning, the light axes of the headlights 10L, 10R are not returned to the straight forward direction immediately. Accordingly, it becomes possible to avoid the driver from feeling odd to the movements of the light axes of the headlights and to avoid the lowering of visibility in the forward direction.

Incidentally, if the system abnormality has occurred while the vehicle is running straight, the swivel control is disabled immediately, because the light axes of the headlights 10L, 10R are directed straight forward at that moment.

As explained above, the apparatus for automatically adjusting horizontally a direction of a light axis of a headlight of a vehicle according to this embodiment has a structure including:

a steering angle sensor (18) detecting a steering angle θ of a steering wheel (17) of the vehicle;

a swivel control unit (20, 11L, 11R) performing a swivel control by which the directions of the light axes of the headlights (10L, 10R) are adjusted horizontally depending on the steering angle of the steering wheel (17); and an abnormality detecting unit (20) detecting abnormality associated with the apparatus.

Even after the abnormality detecting unit detects abnormality associated with the apparatus, the swivel control unit continues performing the swivel control until the light axes of the headlights are returned to the straight forward or initial direction in order to avoid abrupt change of the directions of the light axes of the headlights. The swivel control unit halts the swivel control after the light axes of the headlights are returned to the predetermined initial direction.

In this embodiment, the directions of the light axes of the headlights 10L, 10R are swivel-controlled depending on the steering angle θ even after a system abnormality has occurred, if the steering angle sensor 18 is not responsible for the system abnormality and the steering angle θ is still detected normally from the output signal of the steering angle sensor 18. The swivel control is disabled when the light axes of the headlights 10L, 10R are returned to the straight forward direction. The fail-safe action of this embodiment is characterized in that, when system abnormality has occurred, the light axes of the headlights 10L, 10R are not immediately returned to the straight forward direction but are continued to be swivel-controlled in accordance with the steering angle θ of the steering wheel 17, and fixed at the straight forward direction when they are returned thereto. Thereafter the swivel control is disabled. This fail-safe action makes it possible to avoid the driver from feeling odd to the movements of the light axes of the headlights when a system abnormality has occurred while the vehicle is turning.

Figure 5:
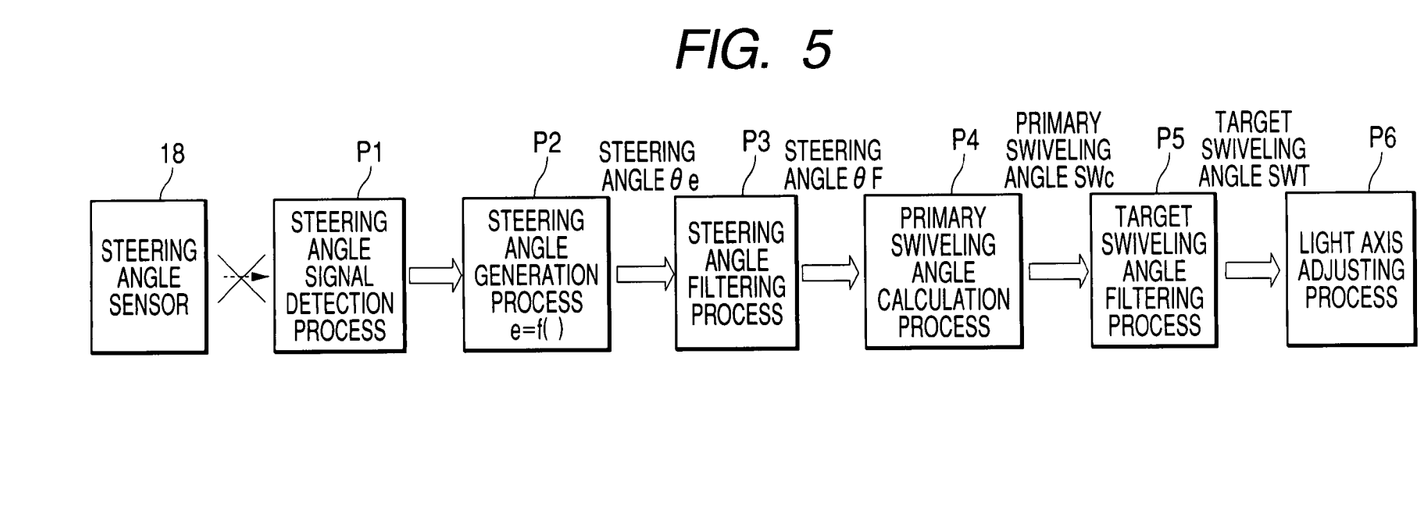
FIG. 5 is a diagram showing a signal flow in executing the swivel control when the output signal from the steering angle sensor is discontinued in the apparatus according to the embodiment of the invention.

FIG. 5 is a diagram showing a signal flow in executing the swivel control when the output signal from the steering angle sensor 18 is discontinued.

Figure 6:
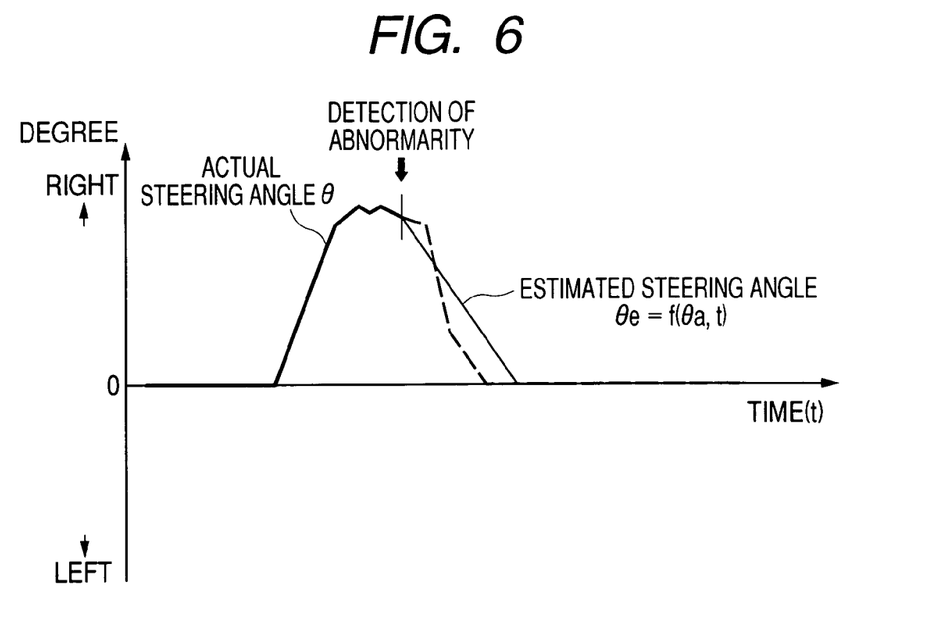
FIG. 6 is a graph showing a progression of an actual steering angle and an estimated steering angle over time when an abnormality has occurred while a vehicle is turning.

If the signal flow between the steering angle sensor 18 and the steering angle signal detection process P1 is discontinued as indicated by the "X" mark in FIG. 5, this abnormality is detected by the abnormality detecting unit constituted by the ECU 20. In the graph of FIG. 6, the heavy solid line represents a progression of the actual steering angle θ over time when the vehicle turns right as shown in FIG. 5. If the abnormality occurs while the vehicle is turning right, it becomes impossible from this moment to detect the actual steering angle θ changing along the broken line shown in FIG. 6. Therefore, an estimated steering angle θe changing smoothly from the value of the last normally detected steering angle to zero degrees as indicated by the thin solid line in FIG. 6 is calculated at the steering angle calculation process P2 as a function of the time (θe=f(θa, t), θa being the steering angle at the moment when the abnormality has occurred, t being the time). As a consequence, the light axes of the headlights 10L, 10R are returned from the swivel-controlled directions to the straight forward direction gradually.

More specifically, this estimated steering angle θe is subjected to the steering angle filtering process P3 using the filter F (not illustrated) to generate the filtered steering angle θF. The filtered steering angle θF is subjected to the primary swiveling angle calculation process P4 to calculate the primary swiveling angle SWC as in the case of the steering angle being detected normally on the basis of the output of the steering angle sensor 18. The primary swiveling angle SWc is subjected to the target swiveling angle filtering process P5 in which the filter FSW (not illustrated) is used to generate the target swiveling angle SWT. The target swiveling angle SWT is supplied to the light axis control process P6 for causing the actuators 11L, 11R to adjust horizontally the directions of the light axes of the headlights 10L, 10R. When the light axes of the headlights 10L, 10R are returned to the straight forward direction, the swivel control is disabled.

To sum up, even if an abnormality which makes the output of the steering angle sensor 18 ineffective has occurred, the swivel control is continued on the basis of the estimated steering angle θe to adjust the directions of the light axes of the headlights 10L, 10R. And when they are directed straight forward (initial direction), the swivel control is disabled.

Accordingly, the light axes of the headlights 10L, 10R are not returned abruptly to the straight forward direction when the system abnormality has occurred while the vehicle is turning, and so it becomes possible to avoid the driver from feeling odd to the movements of the light axes of the headlights and to avoid the lowering of visibility in the forward direction.

If the system abnormality has occurred while the vehicle is running straight, the swivel control is disabled immediately, because the light axes of the headlights 10L, 10R are directed straight forward at that moment.

In the above-described embodiment, the swivel control unit constituted by the ECU 20 and the actuators 11L, 11R may be configured to continue the swivel control in different ways depending on kinds of abnormality occurred. More specifically, the swivel control unit may be configured to adjust the directions of the light axes of the headlights 10L, 10R in accordance with the detected steering angle θ if the steering angle θ is still detected normally, or to return gradually the light axes of the headlights 10L, 10R from the swivel-controlled directions just before the occurrence of the abnormality toward the straight forward direction and fix them at the straight forward direction when they are returned thereto if the steering angle θ is no more detected normally.

This fail-safe action of this configuration also makes it possible to avoid the driver from feeling odd to the movements of the light axes of the headlights when system abnormality has occurred while the vehicle is turning.

In this embodiment, the swivel control unit constituted by the ECU 20 and the actuators 11L, 11R is configured to resume the swivel control upon detection of recovery from the abnormality only after the steering angle θ enters into a predetermined angular range within which the vehicle is assumed to be in a straight-running state.

Such an angular range may be a range extending from +10 degrees through the neutral angular position (0 degrees) to −10 degrees.

With this configuration, if the abnormality is removed while the vehicle is turning, the swivel control is not resumed immediately. The swivel control is resumed only after the vehicle goes into the straight-running state. Therefore, the directions of the light axes of the headlights 10L, 10R are not returned abruptly to the straight forward direction when the abnormality has been removed while the vehicle is turning, and so it becomes possible to avoid the driver from feeling odd to the movements of the light axes of the headlights.

In this embodiment, the swivel control unit constituted by the ECU 20 and the actuators 11L, 11R may be configured to return the light axes of the headlights 10L, 10R to the straight forward direction or initial direction at a rate of 5 to 30 degrees/sec, preferably 10 to 20 degrees/sec upon detection of the abnormality.

The rate at which the light axes of the headlights 10L, 10R are returned to the straight forward direction or initial direction upon detection of the abnormality may be constant, or varied according to the vehicle speed. Alternatively, it may be set at a value specific to the vehicle speed range to which the current vehicle speed belongs. For example, the light axes of the headlights 10L, 10R may be returned to the straight forward direction at a rate of 10 degrees/sec when the vehicle speed is within a lower speed range below 30 km/sec, or at a rate of 20 degrees/sec when the vehicle speed is within a higher speed range equal to or higher than 30 km/sec. It is also possible to return the light axes of the headlights 10L, 10R to the straight forward direction at a rate increasing from 5 degrees/sec to 30 degrees/sec with the increasing vehicle speed.

A software program for executing the whole of the above-described swivel control in the above-described embodiment can be contained in one module. Accordingly, any specific fail-safe program affecting other modules is not necessary, and so, independence among the modules for control of the vehicle and the reliability of the software programs can be maintained high.

The followings show operations of the apparatus for automatically adjusting a direction of a light axis of a vehicle headlight according to the embodiment of the invention for each of different kinds of abnormalities (1) to (4).

(1) When the vehicle height sensor (not illustrated) develops trouble, the leveling control for adjusting vertically the directions of the light axes of the headlights 10L, 10R is disabled.

In this case, the directions of the light axes of the headlights 10L, 10R are adjusted horizontally in accordance with the steering angle θ. And when the steering wheel is turned to the neutral angular position and consequently the light axes of the headlights 10L, 10R are returned to the straight forward direction or initial direction, they are fixed thereto and the swivel control is disabled.

(2) When the actuators (not illustrated) for performing the leveling control on the headlights 10L, 10R develop trouble, the leveling control is disabled.

In this case, the directions of the light axes of the headlights 10L, 10R are adjusted horizontally in accordance with the steering angle θ. And when the steering wheel is turned to the neutral angular position and consequently the light axes of the headlights 10L, 10R are returned to the straight forward direction or initial direction, they are fixed thereto and the swivel control is disabled.

(3) When the actuators 11L, 11R for performing the swivel control on the headlights 10L, 10R develop trouble, the light axis of the headlights 10L or 10R whose actuator 11L or 11R is functioning normally is adjusted horizontally. And when the steering wheel is turned to the neutral angular position and consequently one of the light axes of the headlights 10L, 10R is returned to the straight forward direction or initial direction, it is fixed thereto and the swivel control is disabled.

That is because the likelihood of both the actuators 11L and 11R developing trouble at once is extremely low.

(4) When there occurs a trouble in the communication network such as CAN (Controller Area Network) within the vehicle, the directions of the light axes of the headlights 10L, 10R are adjusted horizontally in accordance with the steering angle θ. And when the steering wheel is turned to the neutral angular position and consequently the light axes of the headlights 10L, 10R are returned to the straight forward direction or initial direction, they are fixed thereto and the swivel control is disabled.

In the above described embodiment, when abnormality originating from the steering angle sensor has occurred, the estimated steering angle θe is calculated in accordance with a predetermined formula in order to return the light axes of the headlights 10L, 10R from the swivel-controlled directions to the straight forward direction gradually. However, it is permissible to generate the estimated steering angle θe by decreasing the value of the last normally detected steering angle at a predetermined rate.

For example, the light axes of the headlights 10L, 10R may be returned to the straight forward direction or initial direction at a rate of 5 to 30 degrees/sec. Alternatively, they may be returned from the swivel-controlled direction to the straight forward direction spending a certain length of time, for example, three seconds.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for automatically adjusting horizontally a direction of a light axis of a vehicle headlight comprising:
    a steering angle sensor detecting a steering angle of a steering wheel of a vehicle;
    a swivel control unit performing a swivel control by which said direction of said light axis of said vehicle headlight is adjusted horizontally depending on said steering angle of said steering wheel; and
    an abnormality detecting unit detecting abnormality associated with said apparatus;
    wherein, after detection of abnormality associated with said apparatus by said abnormality detecting unit, said swivel control unit continues performing said swivel control until said light axis is returned to a predetermined initial direction in order to avoid abrupt change of said direction of said light axis, said swivel control unit halting said swivel control after said light axis is returned to said predetermined initial direction, a rate at which said light axis is returned to a straightforward direction or said predetermined initial direction upon detection of said abnormality is varied according to a speed of the vehicle.

2. An apparatus for automatically adjusting horizontally a direction of a light axis of a vehicle headlight according to claim 1, wherein, if said swivel control unit receives a steering angle signal normally from said steering angle sensor after said detection of said abnormality associated with said apparatus by said abnormality detecting unit, said swivel control unit continues to adjust said direction of said light axis on the basis of said steering angle signal until said light axis is returned to said predetermined initial direction.

3. An apparatus for automatically adjusting horizontally a direction of a light axis of a vehicle headlight according to claim 2, wherein said swivel control units resumes said swivel control when said abnormality detecting unit detects recovery from said abnormality after said steering angle detected by said steering angle sensor enters into a predetermined angular range within which said vehicle is assumed to be in a straight-running state.

4. An apparatus for automatically adjusting horizontally a direction of a light axis of a vehicle headlight according to claim 1, wherein, if said swivel control unit does not receive a steering angle signal normally from said steering angle sensor after said detection of said abnormality associated with said apparatus by said abnormality detecting unit, said swivel control unit adjusts horizontally said direction of said light axis such that said light axis is returned gradually to said predetermined initial direction.

5. An apparatus for automatically adjusting horizontally a direction of a light axis of a vehicle headlight according to claim 4, wherein said swivel control units resumes said swivel control when said abnormality detecting unit detects recovery from said abnormality after said steering angle detected by said steering angle sensor enters into a predetermined angular range within which said vehicle is assumed to be in a straight-running state.

6. An apparatus for automatically adjusting horizontally a direction of a light axis of a vehicle headlight according to claim 4, wherein said swivel control unit returns said light axis to said predetermined initial direction at a rate of 5 to 30 degrees/sec.

7. An apparatus for automatically adjusting horizontally a direction of a light axis of a vehicle headlight according to claim 4, wherein said swivel control unit returns said light axis to said predetermined initial direction at a rate of 10 to 20 degrees/sec.

8. An apparatus for automatically adjusting horizontally a direction of a light axis of a vehicle headlight comprising:
- a steering angle sensor detecting a steering angle of a steering wheel of a vehicle;
- a swivel control unit performing a swivel control by which said direction of said light axis of said vehicle headlight is adjusted horizontally depending on said steering angle of said steering wheel; and
- an abnormality detecting unit detecting abnormality associated with said apparatus;
- wherein, after detection of abnormality associated with said apparatus by said abnormality detecting unit, said swivel control unit continues performing said swivel control until said light axis is returned to a predetermined initial direction, said swivel control unit halting said swivel control after said light axis is returned to said predetermined initial direction, a rate at which said light axis is returned to a straightforward direction or said predetermined initial direction upon detection of said abnormality is varied according to a speed of the vehicle.

9. An apparatus for automatically adjusting horizontally a direction of a light axis of a vehicle headlight according to claim 8, wherein, if said swivel control unit receives a steering angle signal normally from said steering angle sensor after said detection of said abnormality associated with said apparatus by said abnormality detecting unit, said swivel control unit continues to adjust said direction of said light axis on the basis of said steering angle signal until said light axis is returned to said predetermined initial direction.

10. An apparatus for automatically adjusting horizontally a direction of a light axis of a vehicle headlight according to claim 8, wherein, if said swivel control unit does not receive a steering angle signal normally from said steering angle sensor after said detection of said abnormality associated with said apparatus by said abnormality detecting unit, said swivel control unit adjusts horizontally said direction of said light axis such that said light axis is returned gradually to said predetermined initial direction.

* * * * *